US012774698B2

(12) United States Patent
Kjaer

(10) Patent No.: US 12,774,698 B2
(45) Date of Patent: Oct. 27, 2026

(54) WIND TURBINE ALIGNMENT TOOL

(71) Applicant: Vestas Wind Systems A/S, Aarhus N (DK)

(72) Inventor: Ole Kjaer, Silkeborg (DK)

(73) Assignee: Vestas Wind Systems, A/S, Aarhus N. (DK)

( * ) Notice: Subject to any disclaimer, the term of this patent is extended or adjusted under 35 U.S.C. 154(b) by 374 days.

(21) Appl. No.: 18/007,174

(22) PCT Filed: Aug. 3, 2021

(86) PCT No.: PCT/DK2021/050254
§ 371 (c)(1),
(2) Date: Jan. 27, 2023

(87) PCT Pub. No.: WO2022/028661
PCT Pub. Date: Feb. 10, 2022

(65) Prior Publication Data

US 2023/0235727 A1 Jul. 27, 2023

(30) Foreign Application Priority Data

Aug. 6, 2020 (EP) .................................... 20189803

(51) Int. Cl.
*F03D 13/10* (2016.01)
*F03D 13/20* (2016.01)

(52) U.S. Cl.
CPC ............ *F03D 13/10* (2016.05); *F03D 13/20* (2016.05); *F05B 2230/604* (2013.01);
(Continued)

(58) Field of Classification Search
CPC .... F03D 13/10; F03D 13/20; F05B 2230/604; F05B 2240/912; F05B 2260/502
See application file for complete search history.

(56) References Cited

U.S. PATENT DOCUMENTS

| | | | |
|---|---|---|---|
| 5,560,091 | A | 10/1996 | Labit, Jr. |
| 2009/0211174 | A1 | 8/2009 | Henderson et al. |
| 2015/0285225 | A1 | 10/2015 | Ollgaard |

FOREIGN PATENT DOCUMENTS

| | | | |
|---|---|---|---|
| CN | 201603993 | U | 10/2010 |
| CN | 105443321 | A | 3/2016 |

(Continued)

OTHER PUBLICATIONS

European Patent Office, European Search Report issued in corresponding EP Application No. 20189803.8 dated Dec. 23, 2020.

(Continued)

*Primary Examiner* — Moshe Wilensky
(74) *Attorney, Agent, or Firm* — Wood, Herron & Evans, LLP

(57) ABSTRACT

A tool (600; 600') for aligning tubular structures of a wind turbine comprises: a support part for attaching the tool (600; 600') to an end region of a first tubular structure (200) so as to extend axially outward therefrom; and a guide part connected to the support part by a bias part and adapted to engage an interior wall (301*a*) of a second tubular structure (301), wherein the bias part is arranged to urge the guide part to exert a radial force on said interior wall (301*a*) when the second tubular structure (301) is moved axially toward the first tubular structure 200), thereby to guide the second tubular structure (301) into axial alignment with the first tubular structure (200).

20 Claims, 6 Drawing Sheets

(52) U.S. Cl.
CPC ... *F05B 2240/912* (2013.01); *F05B 2260/502* (2013.01); *Y10T 29/49895* (2015.01)

(56) References Cited

FOREIGN PATENT DOCUMENTS

| | | | |
|---|---|---|---|
| CN | 110145441 | A | 8/2019 |
| CN | 210370122 | U | 4/2020 |
| EP | 2754783 | A1 | 7/2014 |
| EP | 2770199 | A2 | 8/2014 |
| EP | 2969883 | A2 | 1/2016 |
| EP | 2998569 | A1 | 3/2016 |
| EP | 2998570 | A1 | 3/2016 |
| GB | 2483678 | A | 3/2012 |
| GB | 2493948 | A | 2/2013 |
| WO | 2011015563 | A2 | 2/2011 |
| WO | 2012007306 | A2 | 1/2012 |
| WO | 2013027048 | A1 | 2/2013 |
| WO | 2014075686 | A1 | 5/2014 |
| WO | 2014150950 | A2 | 9/2014 |
| WO | 2015161854 | A1 | 10/2015 |
| WO | 2018095497 | A1 | 5/2018 |

OTHER PUBLICATIONS

International Searching Authority, International Search Report and Written Opinion issued in corresponding PCT Application No. PCT/DK2021/050254, dated Sep. 8, 2021.

European Patent Office, Extended European Search Report issued in corresponding EP Application No. 21854382.5 dated Aug. 20, 2024.

China National Intellectual Property Adminstration, office action issued in corresponding CN Application No. 202180054650.2, dated May 14, 2025.

WIND TURBINE ALIGNMENT TOOL

FIELD OF THE INVENTION

The present invention relates to a tool for aligning tubular structures of a wind turbine, for example an offshore or onshore wind turbine.

BACKGROUND

A typical wind turbine includes a tubular tower, a nacelle located on the tower and containing a generator connected to a drive hub by a shaft, and rotor blades attached to the drive hub. During installation of the wind turbine onsite, the tower is assembled and the nacelle is attached to the top of the tower, typically using a flange-to-flange connection secured with bolts. For a proper connection, the flanges need to be centrally aligned so that the flanges are positioned face-to-face, and further rotationally aligned so that the boltholes of the flanges match.

The tower may comprise several segments that are placed one on top of the other in order to build the tower. Each of these segments is a large and heavy structure. So too is the nacelle. It is therefore necessary to lift the tower segments and the nacelle using a large crane or other hoisting equipment. These operations are made more difficult because they are typically carried out in non-ideal conditions, such as at sea or in uneven terrain.

In particular, the structures are susceptible to disturbance by wind loads during their installation. In the case of an offshore wind turbine, the tower is additionally subject to forces from water waves. As a result, the nacelle and tower may move laterally relative to each other, as the nacelle is lowered by crane toward the tower for attachment thereto. In a similar manner, upper and lower segments of the tower may move laterally relative to each other during construction of the tower. These lateral movements make it difficult to centrally align the structures and thereby achieve the required flange-to-flange connection between them. The present invention aims to alleviate this problem to at least some extent.

SUMMARY OF THE INVENTION

According to an aspect of the invention, there is provided a tool for aligning tubular structures of a wind turbine, comprising: a support part for attaching the tool to an end region of a first tubular structure so as to extend axially outward therefrom; and a guide part connected to the support part by a bias part and adapted to engage an interior wall of a second tubular structure, wherein the bias part is arranged to urge the guide part to exert a radial force on said interior wall when the second tubular structure is moved axially toward the first tubular structure, thereby to guide the second tubular structure into axial alignment with the first tubular structure.

The bias part functions to counteract a crosswind force that acts on the second tubular structure of the wind turbine, for example a nacelle or a segment of a tower, in order to bring the second tubular structure into axial alignment with the first tubular structure, for example a tower or another segment of a tower. That is, the bias part is arranged to urge the second tubular structure into axial alignment with the first tubular structure. In other words, the bias part provides a restorative force in order to centre the second tubular structure with respect to the first tubular structure.

In addition to the centring effect, the bias part tends to damp lateral oscillations or vibrations of the second tubular structure that are caused by the crosswinds. As a result of the damping, the shock of any contact, between the second tubular structure and the first tubular structure as the second tubular structure is positioned on the first tubular structure, is reduced or eliminated.

Thus the alignment tool provides for the second tubular structure to be progressively guided into axial alignment with the first tubular structure as the second tubular structure is moved axially toward first tubular structure, all the while providing damping of oscillations or vibrations of the first and second tubular structures caused by crosswinds.

As used herein with regard to the relationship between the guide part, the support part, and the bias part, "connected" is interchangeable with "linked". The connection or link, of the guide part to the support part by the bias part, may involve all or only a portion of the bias part.

The bias part may comprise a resilient element, preferably a spring, more preferably a coil spring.

The bias part may comprise a hydraulic element, preferably a hydraulic cylinder.

The guide part may be for positioning radially outward of the support part with respect to a longitudinal axis of the first tubular structure; and the bias part may be arranged to urge the guide part to exert an outward radial force on said interior wall.

At least a portion of the bias part may be located between the support part and the guide part.

The support part may comprise a plurality of support members configured for attachment to the end region of the first tubular structure so as to be spaced apart, preferably equally spaced apart, around the end region of the first tubular structure.

Each one of the support members may comprise: an attachment portion for attaching to the end region of the first tubular structure so as to extend substantially perpendicularly with respect to the longitudinal axis of the first tubular structure; a first upright portion extending substantially perpendicularly from the attachment portion and for positioning at an outer radial location with respect to the longitudinal axis of the first tubular structure; a second upright portion laterally offset from the first upright portion and for positioning at an inner radial location with respect to the longitudinal axis of the first tubular structure; and an inclined portion connecting the first and second upright portions.

The attachment portion and the first upright portion of each one of the support members may be configured so that, when the support members are attached to the end region of the first tubular structure, the distance between opposing pairs of the upright portions of the support members will be substantially the same as the inner diameter of the second tubular structure, such as to provide a snug fit between said upright portions and the interior wall of the second tubular structure.

The guide part may comprise a plurality of guide members and the bias part may comprise a plurality of bias elements, each one of the guide members being connected to the second upright portion of a respective one of the support members by a respective one of the bias elements.

Each one of the guide members may comprise: an upright portion for positioning in substantially parallel relationship with the second upright portion of the respective one of the support members; and an inclined portion extending from the upright portion and preferably for positioning in substantially parallel relationship with the inclined portion of the respective one of the support members.

The tool may comprise a connector part that connects the inclined portions of the guide members together. Preferably the connector part comprises a generally conical shape.

Each one of the bias elements may comprise a coil spring, a first end of the coil spring being attached to the second upright portion of the respective one of the support members and a second end of the coil spring being attached to the upright portion of the respective one of the guide members, such that an axis of the spring is substantially perpendicular to said upright portions.

Each one of the bias elements may comprise a hydraulic cylinder, each one of the hydraulic cylinders being arranged to be in fluid communication with another one of the hydraulic cylinders.

A body of each one of the hydraulic cylinders may be attached to the second upright portion of the respective one of the support members; and a stem of a piston of the hydraulic cylinder may be movable with respect to said body and may be attached to the upright portion of the respective one of the guide members, such that an axis of the hydraulic cylinder is substantially perpendicular to said upright portions.

The entirety of the tool may be contained within a projection of a rim of the end region of the first tubular structure when the tool is attached to said end region.

According to another aspect of the invention, there is provided a wind turbine generator, at least partially installed and comprising a tool as described herein above.

According to another aspect of the invention, there is provided a method of installing a wind turbine generator, comprising: attaching a support part of an alignment tool to an end region of a first tubular structure of the wind turbine generator so as to extend axially outward therefrom, the alignment tool comprising a guide part connected to the support part by a bias part and adapted to engage an interior wall of a second tubular structure of the wind turbine generator; and moving said second tubular structure axially toward the first tubular structure to bring said interior wall into engagement with the guide part of the alignment tool, thereby to enable the bias part to urge the guide part to exert a radial force on the interior wall so as to guide the second tubular structure substantially into axial alignment with the first tubular structure.

The bias part of the alignment tool may comprise a plurality of hydraulic cylinders, each one of the hydraulic cylinders being arranged to be in fluid communication with another one of the hydraulic cylinders; and the method may comprise controlling the hydraulic cylinders to urge the guide part to exert a constant said radial force on the interior wall so as to guide the second tubular structure substantially into said axial alignment with the first tubular structure.

According to another aspect of the invention, there is provided a use of a tool as described herein above in a method as described herein above.

BRIEF DESCRIPTION OF THE DRAWINGS

Embodiments will now be described, by way of example, with reference to the accompanying figures in which.

DETAILED DESCRIPTION

Figure 1:
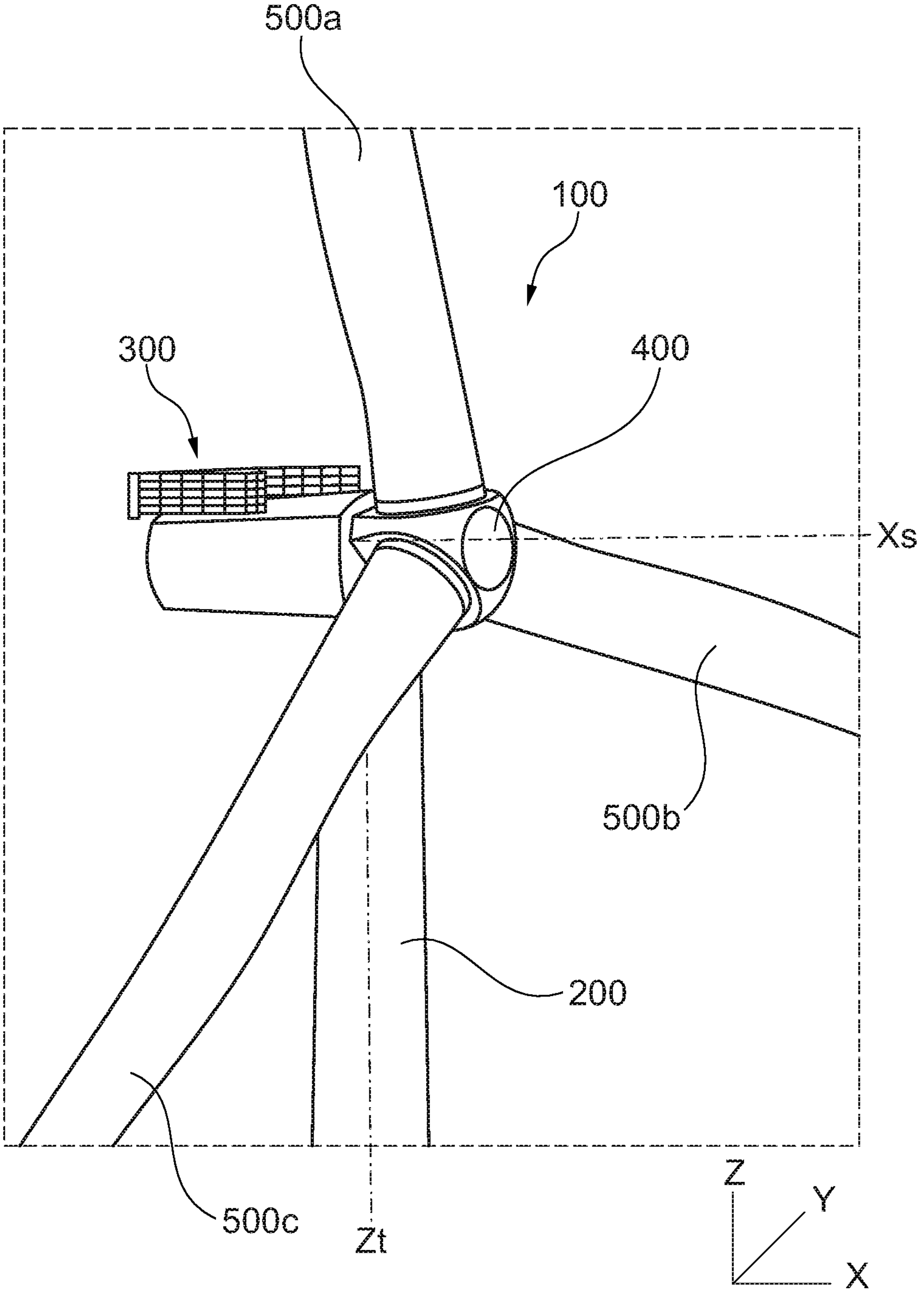
FIG. 1 shows a wind turbine including a nacelle mounted on a tower.

Referring to FIG. 1, an exemplary offshore wind turbine 100 comprises a tower 200 (having a mass of around 200-500 tonnes), a nacelle 300 (around 300-500 tonnes), a rotor hub 400, and a plurality of rotor blades 500*a-c*.

The tower 200 comprises a tubular (e.g. cylindrical) structure having a longitudinal or vertical axis Zt. A lower end of the tower 200 (not shown) is fixed in the seabed. The nacelle 300 is mounted to the tower 200. Although not shown in FIG. 1, a tubular, e.g. cylindrical, structure 301 of the nacelle 300 having a longitudinal or vertical axis Zn extends downwardly from a lower surface of the nacelle 300. The tubular structure 301 of the nacelle 300 comprises a flange part 303 that is attached by bolts to a complementary flange part 201 (not shown) of the upper end of the tower 200, as will be described later herein. The nacelle 300 further comprises a housing 301 containing a generator (not shown). The rotor hub 400 extends from the nacelle 300 and is connected to the generator by a horizontally arranged shaft (not shown) having an axis Xs that is substantially perpendicular to the longitudinal axis Zt of the tower 200. The rotor blades 500*a-c* are attached to the rotor hub 400. In use of the wind turbine 100, a wind force acting on the rotor blades 500*a-c* causes the rotor blades 500*a-c* to rotate about the horizontal axis Xs, thereby to drive the generator via the shaft to produce electrical energy.

The installation of the nacelle 300 on the tower 200 is performed with the aid of an alignment tool, which will now be described.

Figure 2:
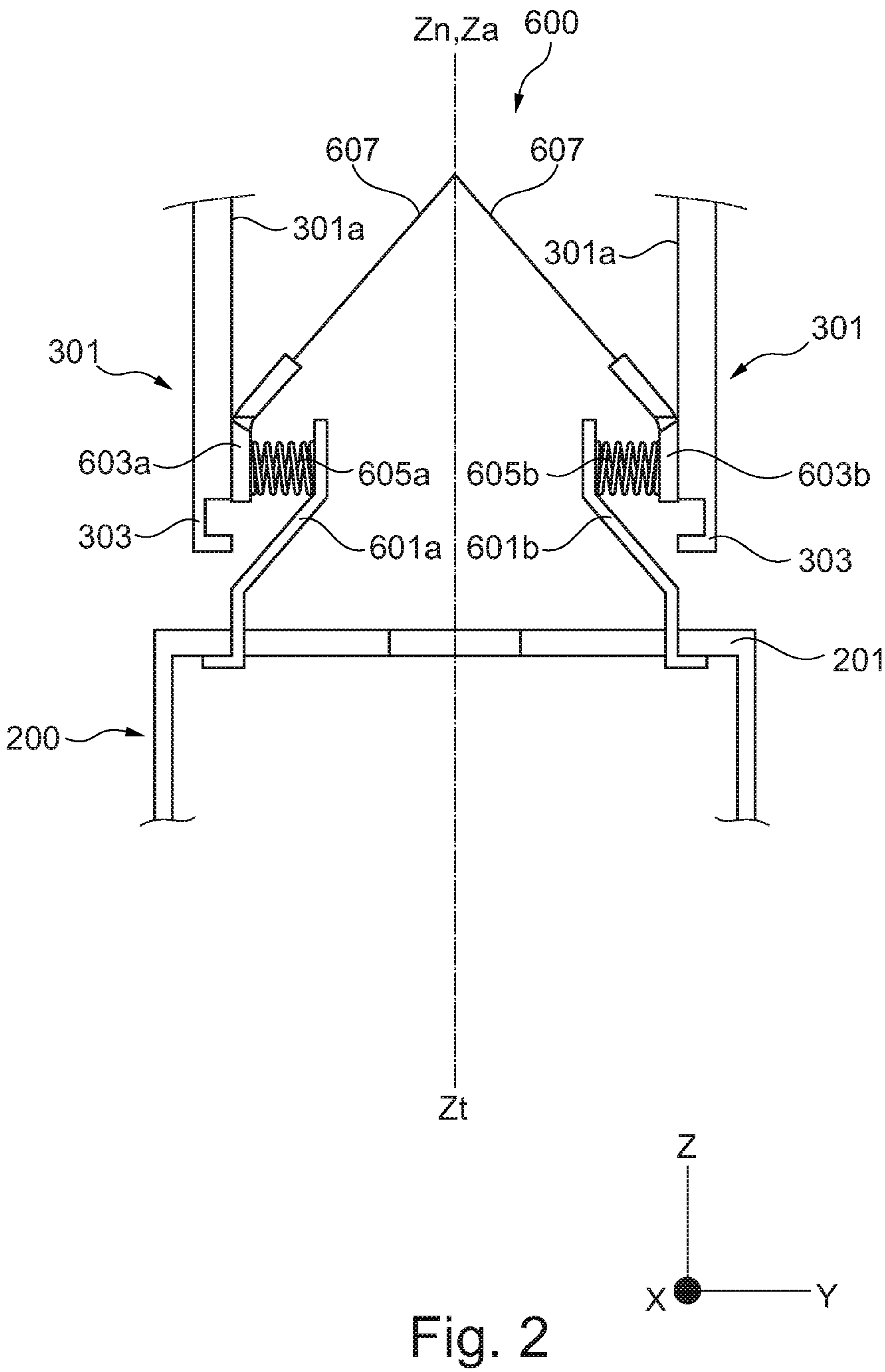
FIGS. 2-4 show an alignment tool according to a first example of the invention, the tool being attached to the tower for aligning the nacelle with the tower.
Figure 3:
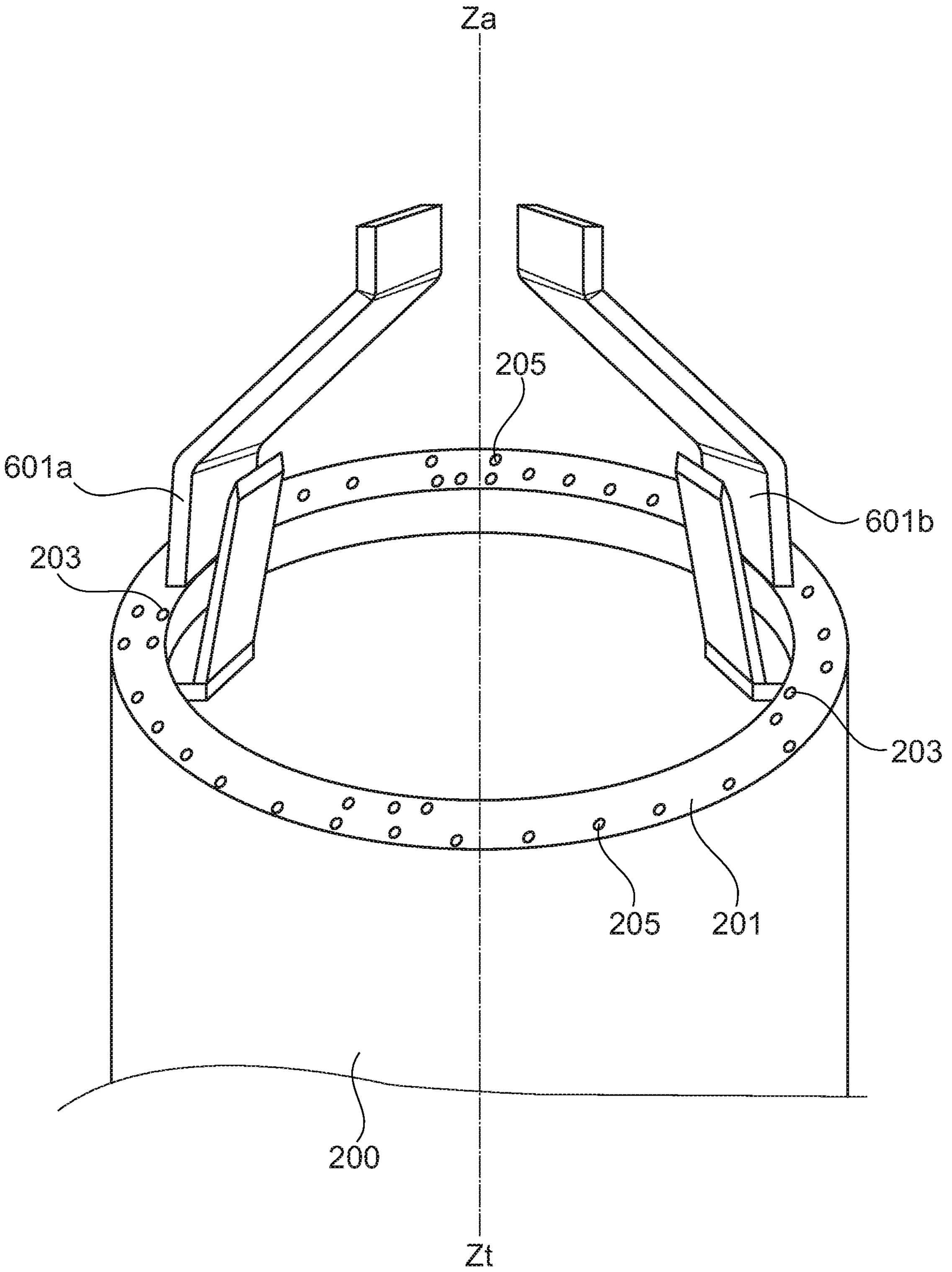

Referring to FIGS. 2 and 3, a first exemplary alignment tool 600 comprises a support part and a guide part connected together by a bias part. In this first example, the support part comprises first and second support members 601*a*, 601*b*. In this first example, the guide part comprises first and second guide members 603*a*, 603*b*. In this first example, the bias part comprises first and second bias members. In this first example, each of the first and second bias members comprises a coil spring 605*a*, 605*b*.

In this first example, each of the first and second support members 601*a*, 601*b* comprises steel. In this first example, each of the first and second support members 601*a*, 601*b* comprises a plate-like construction including a plurality of bends that define a plurality of portions of the support member 601*a*, 601*b*. In this regard, an attachment portion extends horizontally, i.e. substantially perpendicularly to the longitudinal axis Zt of the tower 200, along an under surface of the flange part 201 of the tower 200. The attachment portion comprises through-holes for receiving bolts to secure the support member 601*a*, 601*b* to the flange part 201 of the tower 200. As can be seen in FIG. 3, the flange part 201 is provided with dedicated, radially inner rows of through-holes 203 for this purpose. (For the sake of clarity, only the support members 601*a*, 601*b* of the alignment tool 600 are shown in FIG. 3). The flange part 201 may be wider than is conventional in order to accommodate the radially inner rows of through-holes 203 inward of the conventional flange bolt holes 205. Each of the first and second support members 601*a*, 601*b* is fixed to the flange part 201 of the tower 200 by bolts (not shown), which pass through the through-holes of the attachment portion of the support member 601*a*, 601*b* and the through-holes of the flange part 201 and are fastened at their ends using nuts.

A radially outer upright portion of the support member 601*a*, 601*b* extends vertically upward from the attachment portion, such as to be substantially parallel with the longitudinal axis Zt of the tower 200. An inclined portion of the support member 601*a*, 601*b* extends upwardly and inwardly 200 from the radially outer upright portion, toward the longitudinal axis Zt, such as to be inclined with respect to the radially outer upright portion and the longitudinal axis Zt. A radially inner upright portion extends vertically upward from the inclined portion, such as to be substantially parallel with the radially outer upright portion and the longitudinal axis Zt of the tower 200. Accordingly the inclined portion is inclined also with respect to the radially inner upright portion.

Thus each of the first and second support members 601*a*, 601*b* is attached to the flange part 201 of the upper end of the tower 200 so as to extend upwardly from the upper end of the tower 200 in the axial direction. A central, longitudinal or vertical axis Za of the alignment tool 600 is defined equidistant between the fixed first and second support members 601*a*, 601*b*. As can best be seen in FIG. 3, each portion of each one of the first and second support members 601*a*, 601*b* comprises an inner face, i.e. on the side of the support member 601*a*, 601*b* closest to the longitudinal axis Za of the alignment tool 600, and an outer face, i.e. on the side of the support member 601*a*, 601*b* furthest from the longitudinal axis Za of the alignment tool 600. In this first example the outer face, of the radially outer upright portion of each one of the first and second support members 601*a*, 601*b*, is curved so as to conform to the curved inner wall 301*a* of the tubular structure 301 of the nacelle 300. In this first example the horizontal distance, between the curved outer faces of the radially outer upright portions of the first and second support members 601*a*, 601*b*, is approximately equal to the inner diameter of the tubular structure 301 of the nacelle 300.

In this first example, each of the first and second coil springs 605*a*, 605*b* comprises steel. A first end of each of the coil springs 605*a*, 605*b* is attached to the outer face of the radially inner upright portion of a respective one of the first and second guide members 603*a*, 603*b*. Each of the coil springs 605*a*, 605*b* extends radially outwardly such that the axes of the coil springs 605*a*, 605*b* are substantially perpendicular to the longitudinal axes Za, Zt of the alignment tool 600 and the tower 200. That is, each one of the coil springs 605*a*, 605*b* is arranged horizontally. Furthermore, each one of the coil springs 605*a*, 605*b* connects one of the first and second guide members 603*a*, 603*b* to one of the first and second support members 601*a*, 601*b*. Furthermore, each one of the coil springs 605*a*, 605*b* is located between a respective one of the support members 601*a*, 601*b* and a respective one of the guide members 603*a*, 603*b*.

In this first example, each of the first and second guide members 603*a*, 603*b* comprises steel. In this first example, each of the first and second guide members 603*a*, 603*b* comprises a plate-like construction including a bend that defines two portions of the guide member 603*a*, 603*b*. An upright guide portion is connected to the second end of a respective one of the coil springs 605*a*, 605*b* and extends vertically upward, such as to be substantially parallel with the longitudinal axis Za of the alignment tool 600 and the longitudinal axis Zt of the tower 200. An inclined guide portion of the guide member 603*a*, 603*b* extends upwardly and inwardly from the upright guide portion, toward the longitudinal axis Za of the alignment tool 600 and the longitudinal axis Zt of the tower 200, such as to be inclined with respect to the upright guide portion and the longitudinal axes Za, Zt.

Each portion of each of the first and second guide members 603*a*, 603*b* comprises an inner face, i.e. on the side of the guide member 603*a*, 603*b* closest to the longitudinal axes Za, Zt of the alignment tool 600 and the tower 200, and an outer face, i.e. on the side of the guide member 603*a*, 603*b* furthest from the longitudinal axes Za, Zt. In this first example the intersection, between the outer faces of the upright and inclined guide portions of each of the first and second guide members 603*a*, 603*b*, is rounded or curved. In this first example the outer face, of the upright portion of each one of the first and second guide members 603*a*, 603*b*, is curved so as to conform to the curved inner wall 301*a* of the tubular structure 301 of the nacelle 300. In this first example the horizontal distance, between the curved outer faces of the upright guide portions of the first and second guide members 603*a*, 603*b*, is approximately equal to the inner diameter of the tubular structure 301 of the nacelle 300 when the coil springs 605*a*, 605*b* are in a neutral position, i.e. neither extended nor compressed. Accordingly the horizontal distance, between the curved outer faces of the upright guide portions of the first and second guide members 603*a*, 603*b*, is also approximately equal to the horizontal distance between the curved outer faces of the radially outer upright portions of the first and second support members 601*a*, 601*b*.

Thus the inner face of the upright guide portion of each of the first and second guide members 603*a*, 603*b* is opposed to the outer face of the radially inner upright portion of a respective one of the support members 601*a*, 601*b*, said inner face of the upright guide portion being connected to said outer face of the radially inner upright portion by a respective one of the coil springs 605*a*, 605*b*. Thus said inner face of the upright guide portion, said outer face of the radially inner upright portion, and said respective one of the coil springs 605*a*, 605*b*, are located in the same plane, i.e. the same horizontal plane.

In this first example, respective portions of a connector element 607 extend upwardly and inwardly 200 from the inclined guide portions of the first and second guide members 603*a*, 603*b*, such as to be inclined with respect to the longitudinal axis Za of the alignment tool 600 and the longitudinal axis Zt of the tower 200. Distal ends of the portions of the connector element 607 coincide to form an apex of the connector element 607 at the top or uppermost part of the alignment tool 600. In this first example, the apex coincides with the longitudinal axes Za, Zt of the alignment tool 600 and the tower 200. In this first example, the connector element 607 is rigid such as to form a rigid link between the first and second guide members 603*a*, 603*b*.

As can be seen in FIG. 2, no part or portion of the alignment tool 600 extends laterally of the upper end of the tower 200. That is, the entirety of the alignment tool 600 is contained within a circle projected from the circumferential rim of the upper end of the tower 200. Also, each of the first and second guide members 603*a*, 603*b*, the coil springs 605*a*, 605*b*, and the connector element 607, are located such as to be axially spaced from the endmost part or extremity of the tower 200, along with a majority part of the first and second support members 601*a*, 601*b*, only the lowermost portions of the first and second support members 601*a*, 601*b* being located within the volume of the tubular tower 200. Furthermore, the alignment tool 600 is reflectionally symmetrical about the longitudinal axes Za, Zt of the alignment tool 600 and the tower 200.

The use of the alignment tool 600 in installing the nacelle 300 on the tower 200 will now be described.

Referring again to FIG. 2, the alignment tool 600 is shown attached to the flange part 201 of the upper end of the tower 200 as had been described herein above. Thus the longitudinal axis Za of the alignment tool 600 is coincident with, i.e. lies along, the longitudinal axis Zt of the tower 200. Initially the tool is in a static condition wherein the coil springs 605*a*, 605*b* are in the neutral position, i.e. neither extended nor compressed. Accordingly the first and second guide members 603*a*, 603*b* are equidistant from the longitudinal axis Za of the alignment tool 600 and also from the longitudinal axis Zt of the tower 200.

The nacelle 300 is initially positioned above the tower 200, e.g. using a crane, so that the tower 200 and the tubular structure 301 of the nacelle 300 are approximately in vertical alignment. The nacelle 300 is then lowered toward the tower 200. Due to disturbance forces exerted on the nacelle 300 by crosswinds, the nacelle 300 may move horizontally, i.e. left-right, as well as vertically, i.e. down. As a result, the longitudinal axis Zn of the tubular structure 301 of the nacelle 300 is displaced laterally of the longitudinal axis Zt of the tower 200, for example to the right of the longitudinal axis Zt of the tower 200 in the sense of FIG. 2. The lateral displacement may be up to about 2 metres, depending on the strength of the crosswinds.

Once the flange part 303 of the tubular structure 301 of the nacelle 300, i.e. the lowermost part of the nacelle 300, is below the level of the apex of the connector element 607 of the alignment tool 600, i.e. the uppermost part of the alignment tool 600, the lateral displacement of the nacelle 300 will be limited by the presence of the alignment tool 600. That is, as the nacelle 300 is lowered, lateral movement of the nacelle 300 may cause a portion of the circular flange part 303 to come into contact with one of the inclined portions of the connector element 607, i.e. in this example, the left-hand side portion of the connector element 607. In this way the lateral movement of the nacelle 300 is limited by the inclined portion of the connector element 607. For example, at this stage the lateral movement of the nacelle 300 may be limited to about 0.5 metres.

As the nacelle 300 travels further downwardly, said portion of the flange part 303 will be guided along the surface of the inclined portion of the connector element 607, i.e. under the weight of the nacelle 300, such that the longitudinal axis Zn of the tubular structure 301 of the nacelle 300 will be moved laterally, leftward in this example, toward the longitudinal axis Za of the alignment tool 600 and thereby also toward the longitudinal axis Zt of the tower 200. Thus the inclined portion of the connector element 607 functions to generally guide the nacelle 300 toward axial alignment with the tower 200, even while the nacelle 300 is still subject to lateral movement due to crosswinds.

As the nacelle 300 is lowered still further toward the tower 200, said portion of the flange part 303 of the tubular structure 301 will be guided over the inclined guide portion of the relevant guide member 603*a*, 603*b*, i.e. of left-hand side guide member 603*a* in this example, until said portion of the flange part 303 reaches the intersection with the upright guide portion of that guide member 603*a*. At substantially the same time, an opposite portion of the flange part 303 will contact the intersection between the upright and inclined guide portions of the other guide member 603*a*, 603*b*, i.e. the right-hand guide member 603*b* in this example. The curved intersections will help to further guide the nacelle 300 downward, so that horizontally opposing portions of the inner wall 301*a* of the tubular structure 301 of the nacelle 300 each come into sliding contact with the curved outer face of the upright guide portion of one of the guide members 603*a*, 603*b*. This is the condition shown in FIG. 2. In this condition, the tubular structure 301 of the nacelle 300 is in general axial alignment with the tower 200. That is, the longitudinal axis Zn of the tubular structure 301 is in at least approximate axial alignment with the longitudinal axis Zt of the tower 200.

In this position, the nacelle 300 is still subject to lateral displacement due to disturbance forces exerted on the nacelle 300 by the crosswinds. However the wind forces are countered by the coil springs 605*a*, 605*b*, as follows. For example, the crosswinds may exert a force on the nacelle 300 that causes the nacelle 300 to be displaced leftward in the sense of FIG. 2. The wind force will be transmitted to the upright portion of the right-hand guide member 603*b* via the inner wall 301*a* of the tubular structure 301 of the nacelle 300. As a result the right-hand guide member 603*b* will be moved laterally toward the longitudinal axes Za, Zt of the alignment tool 600 and the tower 200, i.e. leftward in this example, such as to compress the coil spring 605*b* of the right-hand guide member 603*b*. Since the first and second guide members 603*a*, 603*b* are rigidly connected together by the connector element 607, the left-hand guide member 603*a* will at the same time be moved laterally away from the axes Za, Zt of the alignment tool 600 and the tower 200, i.e. leftward in this example, such as to extend the coil spring 605*a* of the left-hand guide member 603*a*.

It will be understood that the magnitude of the resistive force of the coil springs 605*a*, 605*b*, i.e. the resistance of the coil springs 605*a*, 605*b* to displacement from their neutral position, will increase linearly as the coil springs 605*a*, 605*b* are compressed/extended due to the lateral movement of the nacelle 300. Of course, the nacelle 300 will move laterally only when the magnitude of the wind force on the nacelle 300 exceeds the resistive force of the coil springs 605*a*, 605*b*.

It will be understood that the lateral displacement of the left-hand guide member 603*a* will be equal to the lateral displacement of the right-hand guide member 603*b*. For example, the lateral displacement may be around 5 millimetres. It will be further understood that, as a result of the lateral displacement, the first and second guide members 603*a*, 603*b* will no longer be equidistant from the longitudinal axes Za, Zt of the alignment tool 600 and the tower 200, but rather will be at different horizontal distances, in this example the right-hand guide member 603*b* being closer to, and the left-hand guide member 603*a* being further from, the longitudinal axes Za, Zt. However, due to the rigid connection between the first and second guide members 603*a*, 603*b* the horizontal distance, between the first and second guide members 603*a*, 603*b*, remains substantially unchanged in the event of the lateral displacement.

As the transient crosswind force on the nacelle 300 is reduced or removed, the energy stored in the coil springs 605*a*, 605*b* will cause the lateral displacement of the nacelle 300 to be reversed. That is, in this example, the nacelle 300 will be moved laterally rightward as the right-hand coil spring 605*b* extends and the left-hand coil spring 605*a* retracts. As the coil springs 605*a*, 605*b* reach their neutral condition, i.e. neither compressed nor extended, the first and second guide members 603*a*, 603*b* are returned to their original positions with respect to the longitudinal axes Za, Zt of the alignment tool 600 and the tower 200. Since the upright portions of the first and second guide members 603*a*, 603*b* remain in contact with the inner wall 301*a* of the tubular structure 301 of the nacelle 300, the nacelle 300 is likewise returned to its original position with respect to the longitudinal axes Za, Zt. That is, the tubular structure 301 of the nacelle 300 is again in at least approximate axial alignment with the tower 200.

Thus the coil springs 605*a*, 605*b* function to counteract the crosswind force in order to bring the nacelle 300 back into axial alignment with the tower 200. That is, the coil springs 605*a*, 605*b* tend to bias the nacelle 300 into axial alignment with the tower 200. In other words, the coil springs 605*a*, 605*b* function to centre the tubular structure 301 of the nacelle 300 with respect to the tower. Moreover, the coil springs 605*a*, 605*b* provide a restorative force.

In addition to the centring effect, the coil springs 605*a*, 605*b* tend to damp lateral oscillations or vibrations of the nacelle 300 that are caused by the crosswinds. As a result of the damping, the shock of any contact, between the nacelle 300 and the tower 200 as the nacelle 300 is lowered onto the tower 200, is reduced or eliminated.

As the nacelle 300 is lowered toward the tower 200 as described herein above, it might be that the rate of descent of the nacelle 300 is such that the flange part 303 of the tubular structure 301 reaches the inclined part of the support member 601*a*, 601*b* before the coil springs 605*a*, 605*b* have returned to their neutral position. That is, in this example, the flange part 303 may contact the outer face of the inclined portion of the right-hand support member 601*b*, while the tubular structure 301 of the nacelle 301 is still out of alignment with the tower 200, i.e. in this example while the longitudinal axis Zn is still located to the left of the longitudinal axis Zt of the tower 200. In this event, the flange part 303 of the tubular structure 301 will be guided, rightward in this example, along the inclined part of the support member 601*b*, i.e. under the weight of the nacelle 300. Thus the inclined part of the support member 601*b* may assist the spring force in returning the tubular structure 301 of the nacelle 300 into general axial alignment with the tower 200.

Figure 4:
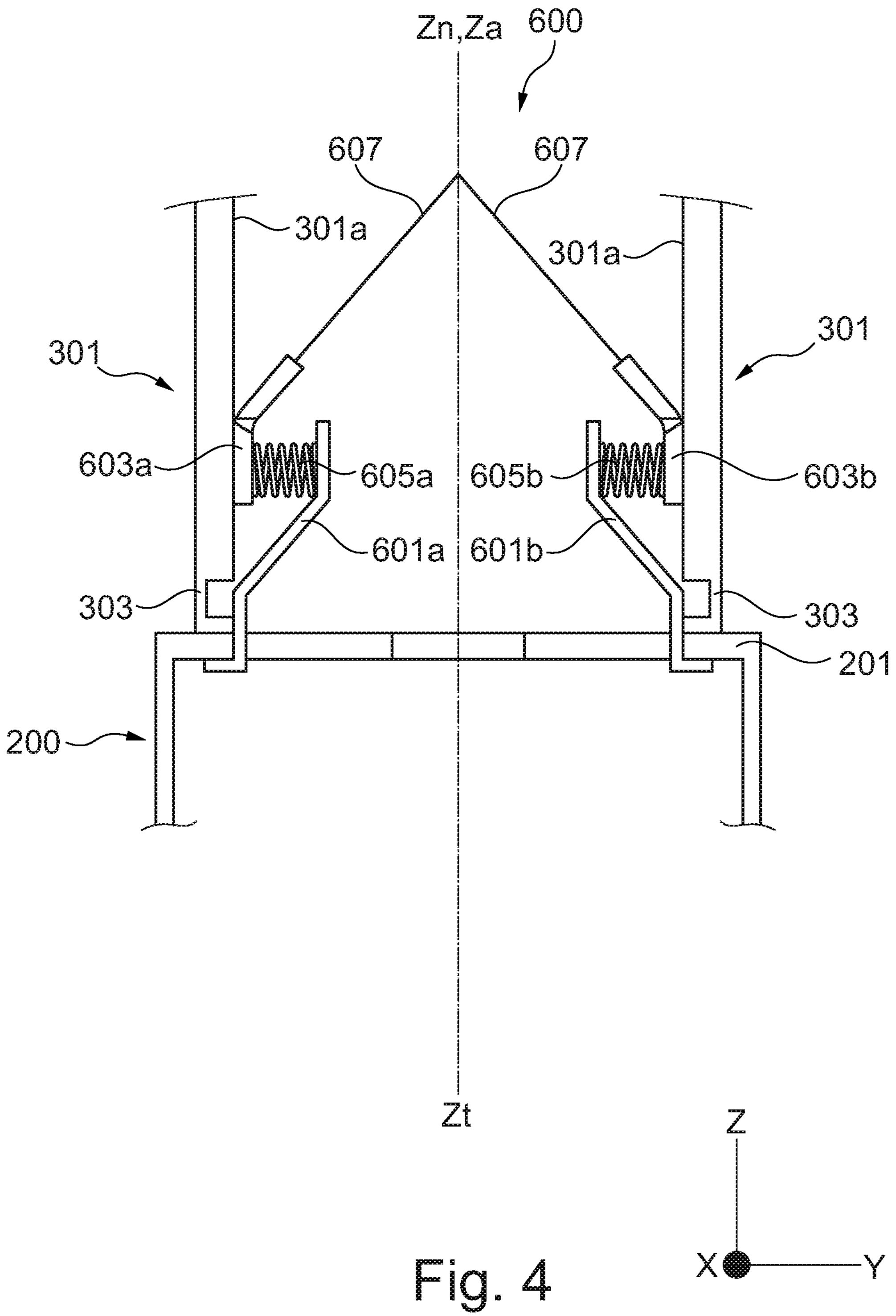

Referring now also to FIG. 4, the nacelle 300 is lowered still further until each one of opposite portions of the inner wall of the flange part 303 of the tubular structure 301 comes into sliding contact with the curved outer face of a respective one of the radially outer upright portions of the support members 601*a*, 601*b*. At this stage, further lateral movement of the nacelle 300 is prevented by the radially outer upright portions of the support members 601*a*, 601*b*, which are in fixed relationship with the tower 200. As the nacelle 300 is lowered even further, the end of the flange part 303 comes into contact with the flange part 201 of the upper end of the tower 200. Thus the nacelle 300 is brought to rest atop the tower 200. In this stationary position, the opposite portions of the inner wall of the flange part 303 of the tubular structure 301 are in abutment with the curved outer faces of the radially outer upright portions of the support members 601*a*, 601*be*, such that the tubular structure 301 of the nacelle 300 is in substantially perfect axial alignment with the tower 200.

Thus the alignment tool 600 provides for the tubular structure 301 of the nacelle 300 to be progressively guided into axial alignment with the tower 200 as the nacelle 200 is lowered toward the tower 200, all the while providing damping of oscillations or vibrations of the nacelle 300 and tower 200 structure caused by crosswinds.

With the nacelle 300 resting on the tower 200, if required the nacelle 300 may be yawed, i.e. rotated about the longitudinal axes Zn, Zt of the nacelle 300 and the tower 200, in order to align the boltholes of the flange part 303 of the tubular structure 301 of the nacelle 300 with the boltholes of the flange part 201 of the upper end of the tower 200. In this regard, the flange part 303 of the tubular structure 301 may be described as a yaw interface between the nacelle 300 and the tower 200. Once the boltholes are aligned, bolts may be installed in the boltholes in order to firmly attach the nacelle 300 to the tower 200.

The alignment tool 600 is preferably then removed, to improve access to the structure for personnel and to allow for the alignment tool 600 to be re-used with another wind turbine. In order to remove the alignment tool 600, the nuts are unfastened and the bolts are withdrawn from the through-holes of the flange part 201 of the tower 200 and the attachment portions of the support members 601*a*, 601*b*.

While in the above-described first example the alignment tool comprises a connector element that rigidly connects the first and second guide members, in another example the connector element is omitted. In such an example, the first and second guide members are capable of independent movement, in that compression of one of the coil springs, i.e. due to lateral movement of the nacelle, does not cause extension of the other coil spring. Accordingly the horizontal distance, between the first and second guide members 603*a*, 603*b*, may be varied in the event of the lateral displacement of the nacelle 300 relative to the longitudinal axes Za, Zt of the alignment tool 600 and the tower 200.

In the above-described first example, when the coil springs are in a neutral position, i.e. neither in compression nor in tension, the horizontal distance, between the curved outer faces of the upright guide portions of the first and second guide members, is approximately equal to the inner diameter of the tubular structure of the nacelle. In another example, when the coil springs are in a neutral position, i.e. neither in compression nor in tension, the horizontal distance, between the curved outer faces of the upright guide portions of the first and second guide members, is greater than the inner diameter of the tubular structure of the nacelle. In such an example, lowering the nacelle onto the upright guide portions causes the coil springs to be compressed, i.e. to pre-load the first and second guide members, such that the first and second guide members will tend to exert an outward radial force on the inner wall of the tubular structure of the nacelle. In this example, the pre-load position of the coil springs may be considered to be their neutral position.

While in the above-described first example the bias parts of the alignment tool comprise coil springs, different types of spring or other resilient elements may be used instead. All of these are within the scope of the claimed invention, provided that they function to provide a restorative force for centring the tubular structure of the nacelle with respect to the tower.

A second exemplary alignment tool 600' will now be described with reference to FIG. 5. The second example is generally similar to the first example, except that in the second example the bias part comprises first and second hydraulic cylinders 609*a*, 609*b* instead of first and second coil springs.

In this second example, each one of the first and second hydraulic cylinders 609*a*, 609*b* is attached to the radially inner upright portion of a respective one of the support members 601*a*, 601*b*, such as to be in fixed relationship therewith. Each one of the first and second hydraulic cylinders 609*a*, 609*b* contains a hydraulic fluid, e.g. oil, and comprises a movable, horizontally arranged piston 609*a*1, 609*b*1 having a stem part that is connected to the upright guide portion of a respective one of the first and second guide members 603*a*, 603*b*. Thus, each one of the first and second hydraulic cylinders 609*a*, 609*b* connects one of the first and second guide members 603*a*, 603*b* to one of the first and second support members 601*a*, 601*b*. Furthermore, each one of the first and second hydraulic cylinders 609*a*, 609*b* is located between a respective one of the support members 601*a*, 601*b* and a respective one of the guide members 603*a*, 603*b*.

Figure 5:
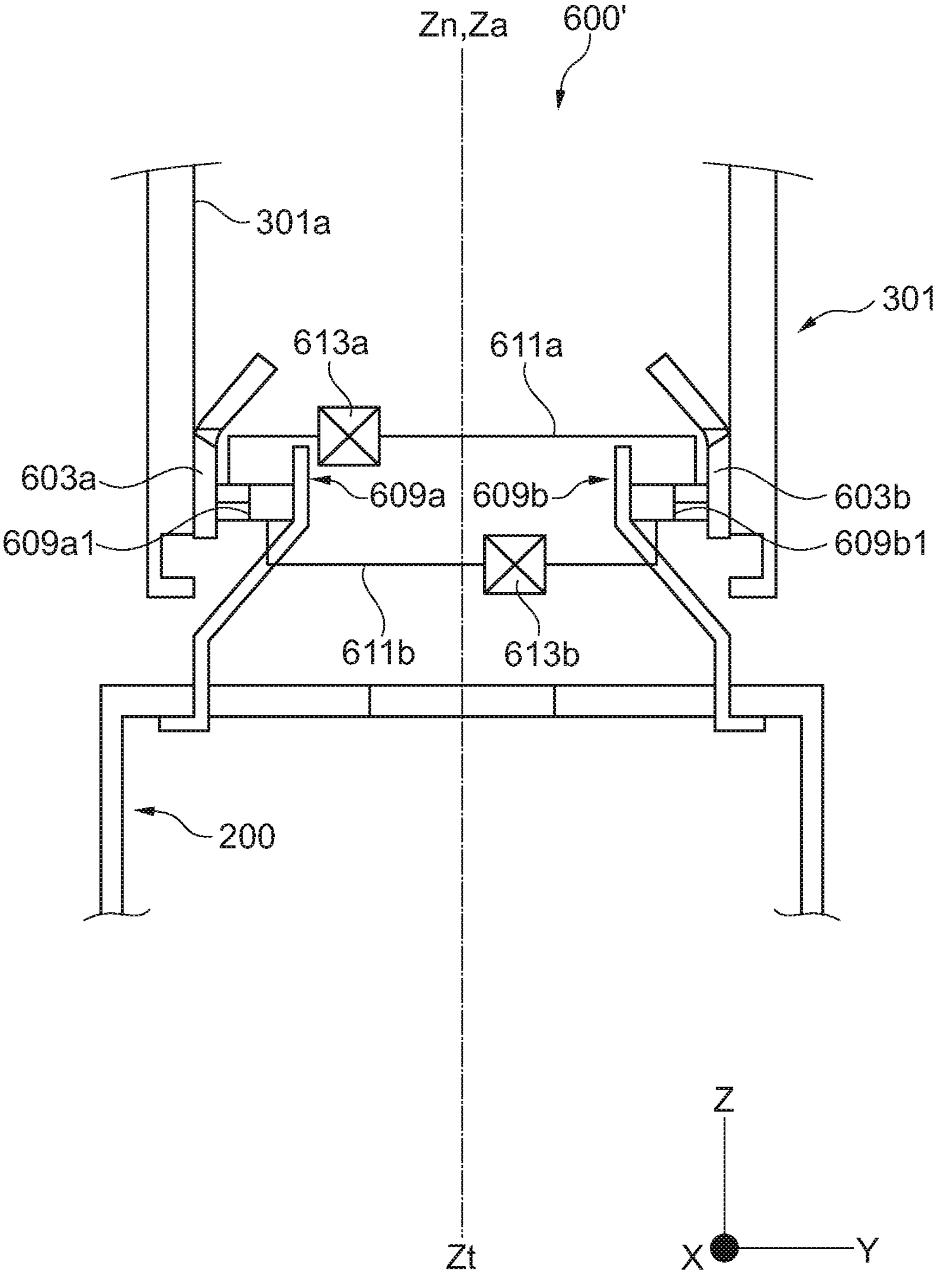
FIG. 5 shows an alignment tool according to a second example of the invention.

As shown in FIG. 5, each of the pistons 609*a*1, 609*b*1 is in a neutral position wherein a head part of the piston 609*a*1, 609*b*1 is midway between the ends of the respective hydraulic cylinder 609*a*, 609*b*. The first and second hydraulic cylinders 609*a*, 609*b* are fluidly connected by a hydraulic circuit comprising first and second hydraulic lines 611*a*, 611*b* and first and second valves 613*a*, 613*b*. A control unit (not shown) is connected to the first and second valves 613*a*, 613*b* and is arranged to control the pressure of the hydraulic fluid in the first and second hydraulic cylinders 609*a*, 609*b*. Also in this second example, the connector element 607 is preferably omitted from the first and second guide members 603*a*, 603*b*.

As has already been described herein above, when the nacelle 300 is lowered toward the tower 200 there comes a stage when the horizontally opposing portions of the inner wall 301*a* of the tubular structure 301 of the nacelle 300 each come into contact with the curved outer face of the upright guide portion of one of the guide members 603*a*, 603*b*. This is the condition shown in FIG. 5 (as well as in FIG. 2).

As has been stated herein above, in this condition the tubular structure 301 of the nacelle 300 is in general axial alignment with the tower 200. That is, the longitudinal axis Zn of the tubular structure 301 is in at least approximate axial alignment with the longitudinal axis Zt of the tower 200. Also in this condition, the nacelle 300 is subject to lateral displacement due to forces exerted on the nacelle 300 by the crosswinds. However, in this second example the wind forces are countered by the first and second hydraulic cylinders 609*a*, 609*b*, as follows.

For example, in the manner already described herein above, the crosswinds may exert a force on the nacelle 300 that causes the nacelle 300 to be displaced leftward in the sense of FIG. 5. The wind force will be transmitted to the upright portion of the right-hand guide member 603*b* via the inner wall 301*a* of the tubular structure 301 of the nacelle 300. As a result the right-hand guide member 603*b* will be moved laterally toward the longitudinal axes Za, Zt of the alignment tool 600' and the tower 200, i.e. leftward in this example, such as to move the piston 609*b*1 of the right-hand hydraulic cylinder 609*b* also toward the longitudinal axes Za, Zt.

The movement of the piston 609*b*1 causes hydraulic fluid to be displaced, from the cylinder volume in front of the piston 609*b*1 of the right-hand hydraulic cylinder 609*b*, to the cylinder volume behind the piston 609*a*1 of the left-hand hydraulic cylinder 609*a*, via the second hydraulic line 611*b* and the second valve 613*b*. Accordingly a fluid pressure is applied to the piston 609*a*1 of the left-hand hydraulic cylinder 609*a* which causes the piston 609*a*1 to move laterally away from the longitudinal axes Za, Zt of the alignment tool 600' and the tower 200, i.e. leftward in this example. The movement of the piston 609*b*1 causes hydraulic fluid to be displaced, from the cylinder volume in front of the piston 609*a*1 of the left-hand hydraulic cylinder 609*a*, to the cylinder volume behind the piston 609*b*1 of the right-hand hydraulic cylinder 609*b*, via the first hydraulic line 611*a* and the first valve 613*a*.

During the lateral displacement of the pistons 609*a*1, 609*b*1 of the first and second hydraulic cylinders 609*a*, 609*b*, i.e. to the left in this example, the first and second hydraulic cylinders 609*a*, 609*b* exert an opposing or resistive force, i.e. to the right in this example, to resist the lateral, i.e. leftward, movement of the nacelle 300. The pressure of the hydraulic fluid in the first and second hydraulic cylinders 609*a*, 609*b* is controlled by the control unit so that the resistive force is of constant magnitude. That is, different from the coil springs 605*a*, 605*b* of the first example, in the second example the resistance of the first and second hydraulic cylinders 609*a*, 609*b* does not increase as the nacelle 300 moves laterally, but rather remains the same. Of course, the nacelle 300 will move laterally only when the magnitude of the wind force on the nacelle 300 exceeds the resistive force of the first and second hydraulic cylinders 609*a*, 609*b*.

It will be understood that the lateral displacement of the left-hand guide member 603*a* will be equal to the lateral displacement of the right-hand guide member 603*b*. For example, the lateral displacement may be around 5 millimetres. It will be further understood that, as a result of the lateral displacement, the first and second guide members 603*a*, 603*b* will no longer be equidistant from the longitudinal axes Za, Zt of the alignment tool 600' and the tower 200, but rather will be at different horizontal distances, in this example the right-hand guide member 603*b* being closer to, and the left-hand guide member 603*a* being further from, the longitudinal axes Za, Zt. However, due to the equal lateral movement of the pistons 609*a*1, 609*b*1 and the flow of the hydraulic fluid between the first and second hydraulic cylinders 609*a*, 609*b*, the horizontal distance, between the first and second guide members 603*a*, 603*b*, remains substantially unchanged in the event of the lateral displacement of the nacelle 300.

As the transient crosswind force on the nacelle 300 is reduced or removed, the constant opposing or resistive force being applied by the hydraulic cylinders 609*a*, 609*b* will cause the lateral displacement of the nacelle 300 to be reversed. That is, the piston 609*a*1 of the left-hand hydraulic cylinder 609*a* will move toward the longitudinal axes Za, Zt of the alignment tool 600' and the tower 200, i.e. rightward in this example. The movement of the piston 609*a*1 causes hydraulic fluid to be displaced, from the cylinder volume in front of the piston 609*a*1 of the left-hand hydraulic cylinder 609*a*, to the cylinder volume behind the piston 609*b*1 of the right-hand hydraulic cylinder 609*b*, via the second hydraulic line 611*b* and the second valve 613*b*. Accordingly a fluid pressure is applied to the piston 609*b*1 of the right-hand hydraulic cylinder 609*b* which causes the piston 609*b*1 to move laterally away from the longitudinal axes Za, Zt of the alignment tool 600' and the tower 200, i.e. rightward in this example. The movement of the piston 609*b*1 causes hydraulic fluid to be displaced, from the cylinder volume in front of the piston 609*b*1 of the right-hand hydraulic cylinder 609*b*, to the cylinder volume behind the piston 609*a*1 of the left-hand hydraulic cylinder 609*a*, via the first hydraulic line 611*a* and the first valve 613*a*.

Thus the nacelle 300 will be moved laterally rightward by the rightward motion of the pistons 609*a*1, 609*b*1 under the constant resistive force. As the pistons 609*a*1, 609*b*1 reach their neutral positions, i.e. with the head parts of the pistons 609*a*1, 609*b*1 at the centres of their respective hydraulic cylinders 609*a*, 609*b*, the first and second guide members 603*a*, 603*b* are returned to their original positions with respect to the longitudinal axes Za, Zt of the alignment tool 600' and the tower 200. Since the upright portions of the first and second guide members 603*a*, 603*b* remain in contact with the inner wall 301*a* of the tubular structure 301 of the nacelle 300, the nacelle 300 is likewise returned to its original position with respect to the longitudinal axes Za, Zt. That is, the tubular structure 301 of the nacelle 300 is in at least approximate axial alignment with the tower 200.

Thus the hydraulic cylinders 609*a*, 609*b* function to counteract the crosswind force in order to bring the nacelle 300 back into axial alignment with the tower 200. That is, the hydraulic cylinders 609*a*, 609*b* provide a restorative force. In other words, the hydraulic cylinders 609*a*, 609*b* tend to bias the nacelle 300 into axial alignment with the tower 200. Put differently, the hydraulic cylinders 609*a*, 609*b* function to centre the tubular structure 301 of the nacelle 300 with respect to the tower.

In addition to the centring effect, the hydraulic cylinders 609*a*, 609*b* tend to damp lateral oscillations or vibrations of the nacelle 300 that are caused by the crosswinds. As a result of the damping, the shock of any contact, between the nacelle 300 and the tower 200 as the nacelle 300 is lowered onto the tower 200, is reduced or eliminated. Furthermore, the first and second valves 613*a*, 613*b*. may be adjusted in order to change the degree of resistance and damping provided by the first and second hydraulic cylinders 609*a*, 609*b*.

It will be understood that the second exemplary alignment tool 600' is similar to the first exemplary alignment tool 600, with regard to the further lowering of the nacelle 300 and the final alignment of the nacelle 300 with the tower 200. Therefore these operations will not be described here in respect of the second exemplary alignment tool 600'.

Figure 6:
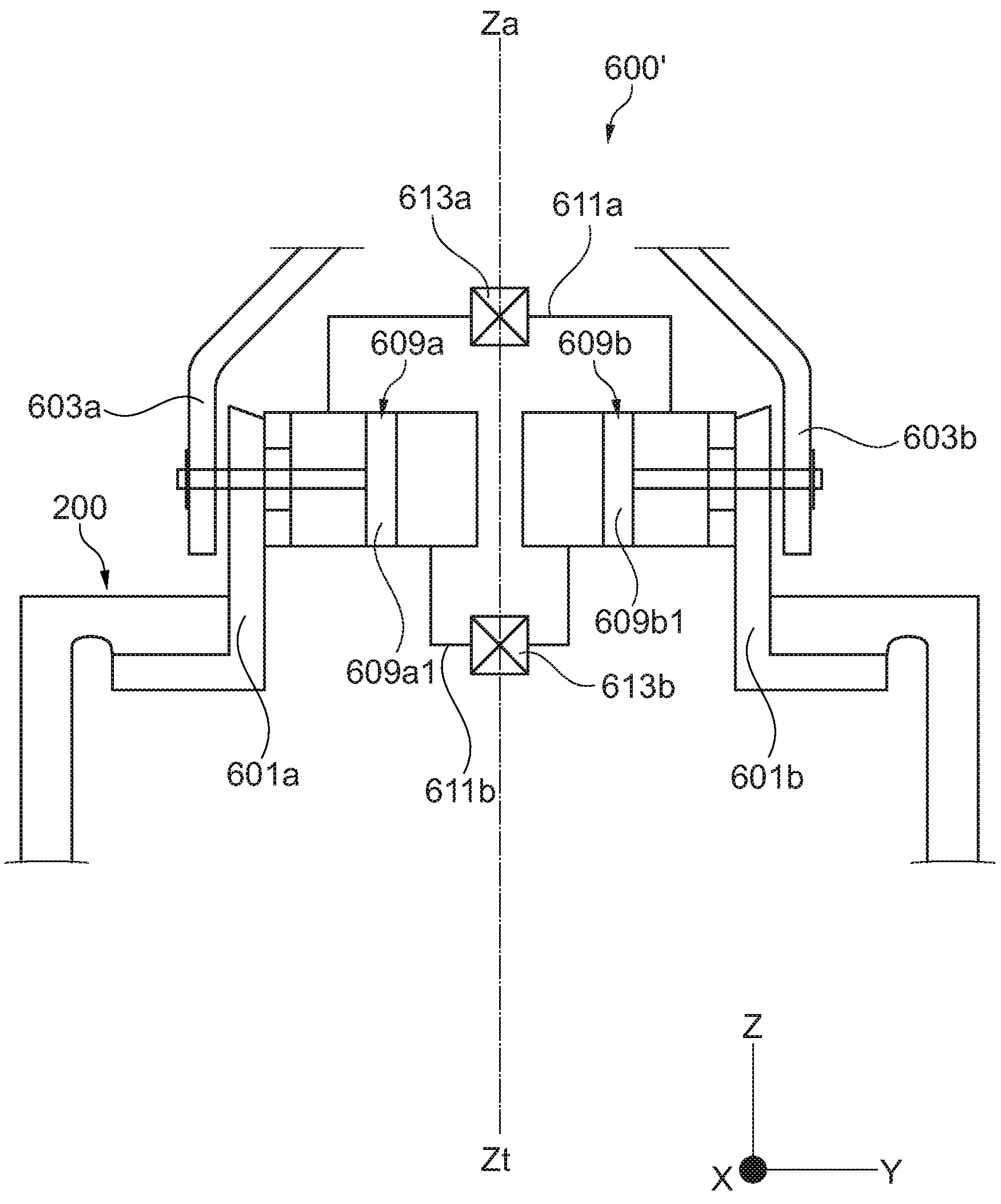
FIG. 6 shows a variant of the alignment tool of FIG. 5.

A variant of the second exemplary alignment tool 600' is shown in FIG. 6. The variant differs with respect to the mounting of the first and second hydraulic cylinders 609*a*, 609. In the variant, the support members 601*a*, 601*b* are simplified in comparison with the second example, in that they include a single upright portion.

As in the second example, each one of the first and second hydraulic cylinders 609*a*, 609 is attached to a respective one of the support members 601*a*, 601*b*, such as to be in fixed relationship therewith. Different from the second example, however, in the variant the body of each one of the first and second hydraulic cylinders 609*a*, 609 is located radially inward of the respective one of the support members 601*a*, 601*b*. Similar to the second example, in the variant a stem part of the piston 609*a*1, 609*b*1 of each one of the first and second hydraulic cylinders 609*a*, 609 is connected to a respective one of the first and second guide members 603*a*, 603*b*. In the variant, however, the stem part of the piston 609*a*1, 609*b*1 extends through the respective support member 601*a*, 601*b* to the respective guide member 603*a*, 603*b*. In this manner, each of the first and second guide members 603*a*, 603*b* is connected to a respective one of the support members 601*a*, 601*b* by a respective one of the first and second hydraulic cylinders 609*a*, 609.

Besides the above-described structural differences, the variant is functionally similar to the second exemplary alignment tool 600' with regard to the operation of the first and second hydraulic cylinders 609*a*, 609. Therefore the operation will not be described here in respect of the variant.

While in the above-described examples the support part comprises two opposing support members, in other examples the support part comprises more than two support members. In such examples, substantially any number of support members may be attached to the upper end of the tower, the support members being circumferentially spaced from each other, preferably equally circumferentially spaced. In one such example, three support members are circumferentially spaced from each other by 120 degrees. In another such example, four support members are circumferentially spaced from each other by 90 degrees. In another such example, six support members are circumferentially spaced from each other by 60 degrees. In another such example, eight support members are circumferentially spaced from each other by 45 degrees. In these examples, each one of the support members may be connected to a guide member by a bias part, in the manner described herein above. Also in these examples, the guide members may all be connected together by a single connector element, for example having the form of a cone or an inverted bowl or a hat, for guiding the nacelle as the nacelle is lowered toward the tower. Furthermore, in another example the support part and/or a corresponding guide part comprises just a single support/guide member. In one such example, the support member is generally circular, such as to extend around the full circumference of the upper end of the tower. In this example, the guide member may have the form of a cone or an inverted bowl or a hat. Also in this example, the guide member is connected to the support member by one or more bias parts.

In the above-described examples, the horizontal distance, between the curved outer faces of the radially outer upright portions of the first and second support members, is approximately equal to the inner diameter of the tubular structure of the nacelle. As a result, the inner wall of the tubular structure of the nacelle is in abutment with the curved outer faces of the radially outer upright portions when the nacelle comes to rest on the tower, such that the nacelle is prevented from lateral movement relative to the tower when subjected to crosswinds. In another example, the horizontal distance, between the curved outer faces of the radially outer upright portions of the first and second support members, is less than the inner diameter of the tubular structure of the nacelle. In such as example, the support part further comprises location members that are attachable to the flange part of the tower, for example in a similar manner as the support members, for example to be circumferentially spaced between the support members. The location members each comprise an upright part including a curved outer face configured to conform to the curved inner wall of the tubular structure of the nacelle. When the location members are attached to the flange of the tower, the horizontal distance, between the curved outer faces of the upright parts of opposing location members, is approximately equal to the inner diameter of the tubular structure of the nacelle. Thus, when the nacelle is lowered to the tower, the inner wall of the tubular structure of the nacelle comes into abutment with the curved outer faces of the upright parts of the location members. Accordingly the nacelle is prevented from lateral movement relative to the tower when subjected to crosswinds. Thus the location members provide an alternative means of constraining lateral movement of the nacelle when the nacelle is in the resting position on the tower.

In the above-described examples, the flange part of the tower is provided with dedicated, radially inner rows of boltholes for the purpose of attachment of the support members of the alignment tool. As has been stated, this may be enabled by the provision of a wider flange part of the tower than is conventional. In another example, which may be suitable for use with a conventional, i.e. un-widened, flange part, the radially inner rows of boltholes are omitted. Instead, threaded bolts are used to secure the attachment portions of the support members to threaded holes, optionally blind threaded holes, provided in the flange part. Alternatively, the holes provided in the flange part are unthreaded and expansion bolts are used to secure the attachment portions of the support members in the unthreaded holes.

While in the above-described examples the alignment tool has been described in respect of the axial alignment of a tubular tower and a tubular part of a nacelle, it will be understood that the alignment tool is equally suitable for the axial alignment of other tubular structures of a wind turbine, for example tubular segments or sections of a wind turbine tower. It will be further understood that the alignment tool is also suitable for use with tubular structures that are non-cylindrical, for example oval, elliptical, or rectangular tubular structures of wind turbines.

It should be understood that the invention has been described in relation to its preferred embodiments and may be modified in many different ways without departing from the scope of the invention as defined by the accompanying claims.

The invention claimed is:

1. A tool for aligning tubular structures of a wind turbine, comprising:
- a support part for attaching the tool to an end region of a first tubular structure so as to extend axially outward therefrom; and
- a guide part connected to the support part by a bias part and adapted to engage an interior wall of a second tubular structure,
- wherein the tool is configured such that:
  - the guide part and the bias part are located externally of the first tubular structure and axially spaced from the end region of the first tubular structure when the tool is attached to the end region of the first tubular structure, and
  - the bias part is arranged to urge the guide part to exert a radial force on said interior wall when the second tubular structure is moved axially toward the first tubular structure, thereby to guide the second tubular structure into axial alignment with the first tubular structure.

2. The tool according to claim 1, wherein the bias part comprises a resilient element.

3. The tool according to claim 1, wherein the bias part comprises a hydraulic element.

4. The tool according to claim 1, wherein:
- the guide part is configured to be positioned radially outward of the support part with respect to a longitudinal axis (Zt) of the first tubular structure; and
- the bias part is arranged to urge the guide part to exert an outward radial force on said interior wall.

5. The tool according to claim 4, wherein at least a portion of the bias part is located between the support part and the guide part.

6. The tool according to claim 5, wherein the support part comprises a plurality of support members configured for attachment to the end region of the first tubular structure so as to be spaced apart around the end region of the first tubular structure.

7. The tool according to claim 6, wherein each one of the support members comprises:
- an attachment portion for attaching to the end region of the first tubular structure so as to extend substantially perpendicularly with respect to the longitudinal axis (Zt) of the first tubular structure;
- a first upright portion extending substantially perpendicularly from the attachment portion and for positioning at an outer radial location with respect to the longitudinal axis (Zt) of the first tubular structure;
- a second upright portion laterally offset from the first upright portion and for positioning at an inner radial location with respect to the longitudinal axis (Zt) of the first tubular structure; and
- an inclined portion connecting the first and second upright portions.

8. The tool according to claim 7, wherein the attachment portion and the first upright portion of each one of the support members are configured so that, when the support members are attached to the end region of the first tubular structure, the distance between opposing pairs of the upright portions of the support members will be substantially the same as the inner diameter of the second tubular structure, such as to provide a snug fit between said upright portions and the interior wall of the second tubular structure.

9. The tool according to claim 7, wherein the guide part comprises a plurality of guide members and the bias part comprises a plurality of bias elements, each one of the guide members being connected to the second upright portion of a respective one of the support members by a respective one of the bias elements.

10. The tool according to claim 9, wherein each one of the guide members comprises:
- an upright portion for positioning in substantially parallel relationship with the second upright portion of the respective one of the support members; and
- an inclined portion extending from the upright portion for positioning in substantially parallel relationship with the inclined portion of the respective one of the support members.

11. The tool according to claim 10, comprising a connector part that connects the inclined portions of the guide members together.

12. The tool according to claim 10, wherein each one of the bias elements comprises a coil spring, a first end of the coil spring being attached to the second upright portion of the respective one of the support members and a second end of the coil spring being attached to the upright portion of the respective one of the guide members, such that an axis of the coil spring is substantially perpendicular to said upright portions.

13. The tool according to claim 10, wherein each one of the bias elements comprises a hydraulic cylinder, each one of the hydraulic cylinders being arranged to be in fluid communication with another one of the hydraulic cylinders.

14. The tool according to claim 13, wherein:
- a body of each one of the hydraulic cylinders is attached to the second upright portion of the respective one of the support members; and
- a stem of a piston of the hydraulic cylinder is movable with respect to said body and is attached to the upright portion of the respective one of the guide members, such that an axis of the hydraulic cylinder is substantially perpendicular to said upright portions.

15. The tool according to claim 1, wherein
- the guide part is configured such that the second tubular structure is in axial alignment with the first tubular structure prior to the second tubular structure making contact with the first tubular structure.

16. A tool for aligning tubular structures of a wind turbine, comprising:
- a support part for attaching the tool to an end region of a first tubular structure so as to extend axially outward therefrom; and
- a guide part connected to the support part by a bias part and adapted to engage an interior wall of a second tubular structure, wherein the tool is configured such that:

the bias part is radially outboard of the support part and radially inboard of the guide part structure when the tool is attached to the end region of the first tubular structure, and the bias part is arranged to urge the guide part to exert a radial force on said interior wall when the second tubular structure is moved axially toward the first tubular structure, thereby to guide the second tubular structure into axial alignment with the first tubular structure.

17. The tool according to claim 16, wherein the guide part is configured such that the second tubular structure is in axial alignment with the first tubular structure prior to the second tubular structure making contact with the first tubular structure.

18. A wind turbine generator, at least partially installed and comprising a tool according to claim 1.

19. A method of installing a wind turbine generator using a tool according to claim 1, comprising:

attaching the support part of the tool to an end region of a first tubular structure of the wind turbine generator so as to extend axially outward therefrom; and moving a second tubular structure of the wind turbine generator axially toward the first tubular structure to bring an interior wall of the second tubular structure into engagement with the guide part of the tool, thereby to enable the bias part to urge the guide part to exert a radial force on the interior wall so as to guide the second tubular structure substantially into axial alignment with the first tubular structure.

20. The method of installing a wind turbine generator according to claim 19, wherein:

the bias part of the alignment tool comprises a plurality of hydraulic cylinders, each one of the hydraulic cylinders being arranged to be in fluid communication with another one of the hydraulic cylinders; and the method comprises controlling the hydraulic cylinders to urge the guide part to exert a constant said radial force on the interior wall so as to guide the second tubular structure substantially into said axial alignment with the first tubular structure.

* * * * *